United States Patent
Yeh et al.

(10) Patent No.: US 8,452,338 B2
(45) Date of Patent: May 28, 2013

(54) TELEPHONE CALL AND ALARM CONTROL METHODS FOR A CELL PHONE

(75) Inventors: I-Hau Yeh, Hsinchu (TW); Kun-Ming Tsai, Hsinchu (TW); Joe Tsung-Ying Yeh, Saratoga, CA (US); Theresa I-Hsing Yeh, Saratoga, CA (US)

(73) Assignee: Elan Microelectronics Corporation, Hsinchu (TW)

( * ) Notice: Subject to any disclaimer, the term of this patent is extended or adjusted under 35 U.S.C. 154(b) by 485 days.

(21) Appl. No.: 12/728,586

(22) Filed: Mar. 22, 2010

(65) Prior Publication Data
US 2010/0261505 A1 Oct. 14, 2010

(30) Foreign Application Priority Data

Apr. 14, 2009 (TW) .............................. 98112314 A

(51) Int. Cl.
*H04W 88/02* (2009.01)

(52) U.S. Cl.
USPC ........................................................ 455/566

(58) Field of Classification Search
None
See application file for complete search history.

(56) References Cited

U.S. PATENT DOCUMENTS

| 2008/0055263 A1* | 3/2008 | Lemay et al. ................. 345/173 |
| 2008/0211783 A1* | 9/2008 | Hotelling et al. ............. 345/173 |

FOREIGN PATENT DOCUMENTS

CN 101287032 A 10/2008

OTHER PUBLICATIONS

Communication Dated Nov. 26, 2012, From Taiwan Patent Office Regarding a Counterpart Foreign Patent Application.

* cited by examiner

*Primary Examiner* — Philip Sobutka
(74) *Attorney, Agent, or Firm* — Rosenberg, Klein & Lee

(57) ABSTRACT

Control methods for a cell phone are provided upon occurrence of a particular event, which receive a contact-related information from a touch screen of the cell phone, analyze the contact-related information to identify the contact position, the number of contact objects, or a gesture, to determine a further step to deal with the particular event. The particular event may include receipt of a call, sounding of an alarm of the cell phone, displaying of a short message on the touch screen, receipt of an interrupting call, or a standby mode of the cell phone.

40 Claims, 16 Drawing Sheets

TELEPHONE CALL AND ALARM CONTROL METHODS FOR A CELL PHONE

FIELD OF THE INVENTION

The present invention is related generally to a control method for a cell phone and, more particularity, to a control method for operating a cell phone with a touch control interface.

BACKGROUND OF THE INVENTION

Conventionally, cell phones operate on commands that are inputted by pressing buttons on the cell phones. For example, when receiving a call, a user may press an "Answer" button to answer the call, or press a "Hang Up" button or "Busy" button to refuse the call, or simply ignore the call and wait until the caller hangs up. While waiting for the caller to hang up, the user may wish to switch the call alert from a ringing mode to a silent or vibration mode so as not to interfere with other people. However, switching the call alert of a silent or vibration mode typically involves a complicated procedure that includes screen change, mode selection, and so on. Therefore, in order to facilitate the operation, some cell phones are now equipped with a shortcut button that enables a user to rapidly switch the mode of the call alert when receiving a call.

Recently, as touch control interfaces gain increasing popularity, more and more cell phone manufactures use touch screens as the input interfaces of cell phones. For these cell phones, however, virtual buttons are displayed on the touch screens for users to press for command input. Hence, these cell phones, in a sense, are still operated in the same way as those with physical buttons.

The present invention provides a control method for a cell phone that is based on the currently fully developed software and hardware of touch control interfaces. Thus, upon occurrence of a particular event, a user can input commands into the cell phone in ways other than pressing buttons, thereby enabling more user-friendly operation of the cell phone.

SUMMARY OF THE INVENTION

An object of the present invention is to provide control methods for a cell phone.

According to the present invention, a control method for a cell phone analyzes contact-related information from a touch screen of the cell phone, such as the contact position, the number of contact objects, or the gesture on the touch screen, and accordingly, determines the response to a call or a sounding alarm. The process for dealing with the call includes putting the call through, refusing the call, or switching the call alert to a silent mode. The process for dealing with a sounding alarm includes stopping the alarm or delaying the sounding time of the alarm.

According to an embodiment of the present invention, when a cell phone receives a call or when an alarm of the cell phone sounds, an interactive animated picture is displayed on a touch screen of the cell phone. The animated picture includes a main figure, and the cell phone determines the subsequent process depending on whether or not a user's finger touches a predetermined area around the main figure.

According to other embodiments of the present invention, the cell phone determines the subsequent process depending on the number of contact objects or the gesture on the touch screen.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
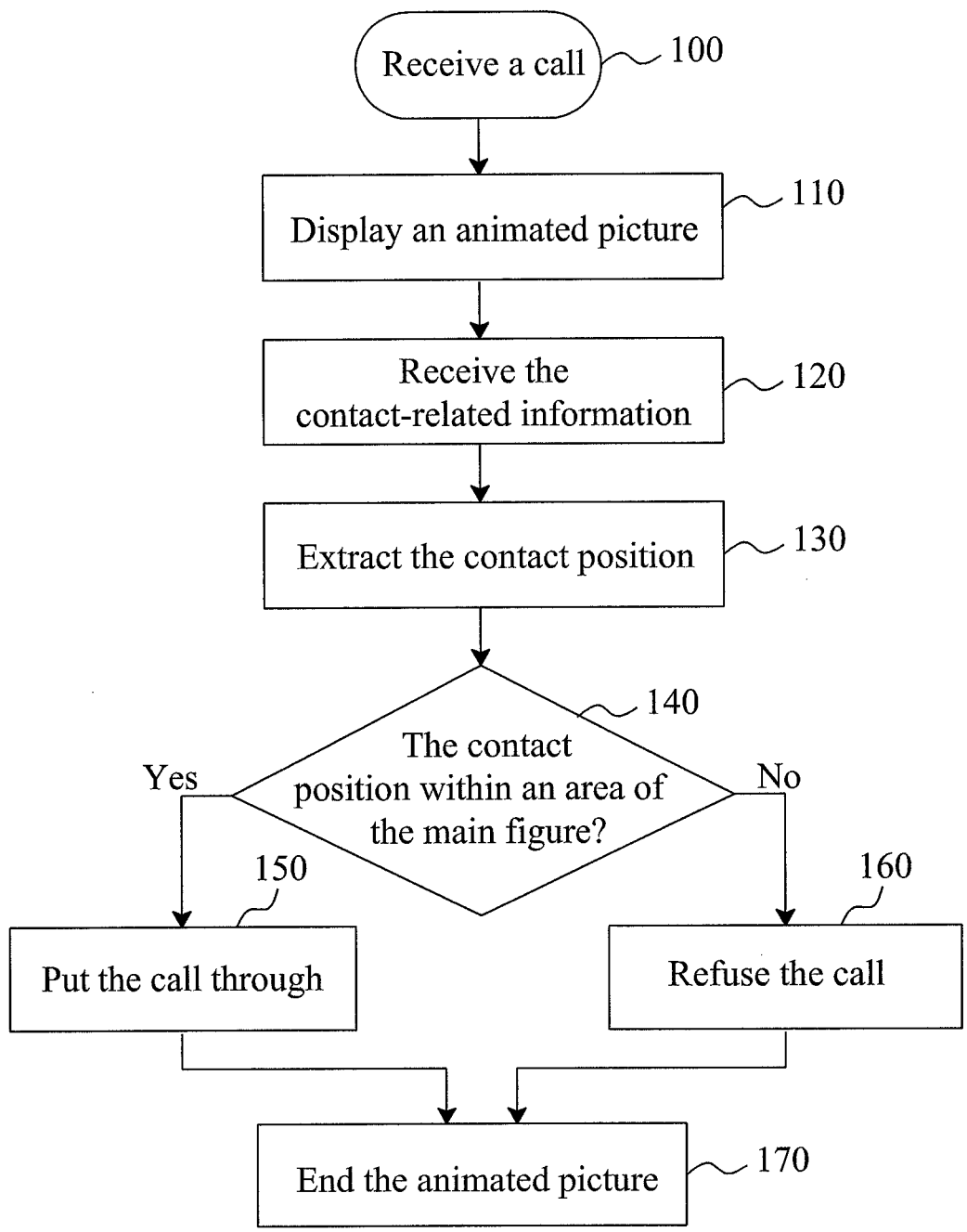
FIG. 1 is a flowchart of a first embodiment according to the present invention.

FIG. 1 is a flowchart of a first embodiment according to the present invention, which shows the steps of controlling a cell phone when it receives a call. Upon receiving a call in step 100, a touch screen of the cell phone displays an animated picture in step 110. The animated picture is an interactive one having a main figure which might be a figure of a cat, a figure of a dog, or other preset figures, and can be a still, or a moving object changing the position with time. When a user touches the touch screen by finger or other electrically conductive objects, the cell phone receives the contact-related information of the contact on the touch screen in step 120 and then extracts the contact position in step 130 according to the contact-related information. Following that, step 140 determines whether or not the contact position falls within an area occupied by the main figure. If yes, the call is put through in step 150; otherwise, the call is refused in step 160. Then, the display of the animated picture is ended in step 170.

The interaction between a user and an animated picture displayed on a touch screen is well-known to those skilled in the art of touch screens. Therefore, a detailed description of such interaction is omitted herein. Nintendo Company Ltd., Japan, uses this kind of interaction technique in portable game consoles such that animated pictures displayed on touch screens of the game consoles are changed as users touch different positions of the touch screens.

Alternatively, the process to be executed is determined by which part of the main figure is touched. For instance, the call is put through if the head of the main figure is touched; the call alert of the cell phone is switched from a ringing mode to a silent mode if the feet of the main figure are touched; and the call is refused if the contact position is outside the main figure.

Figure 2:
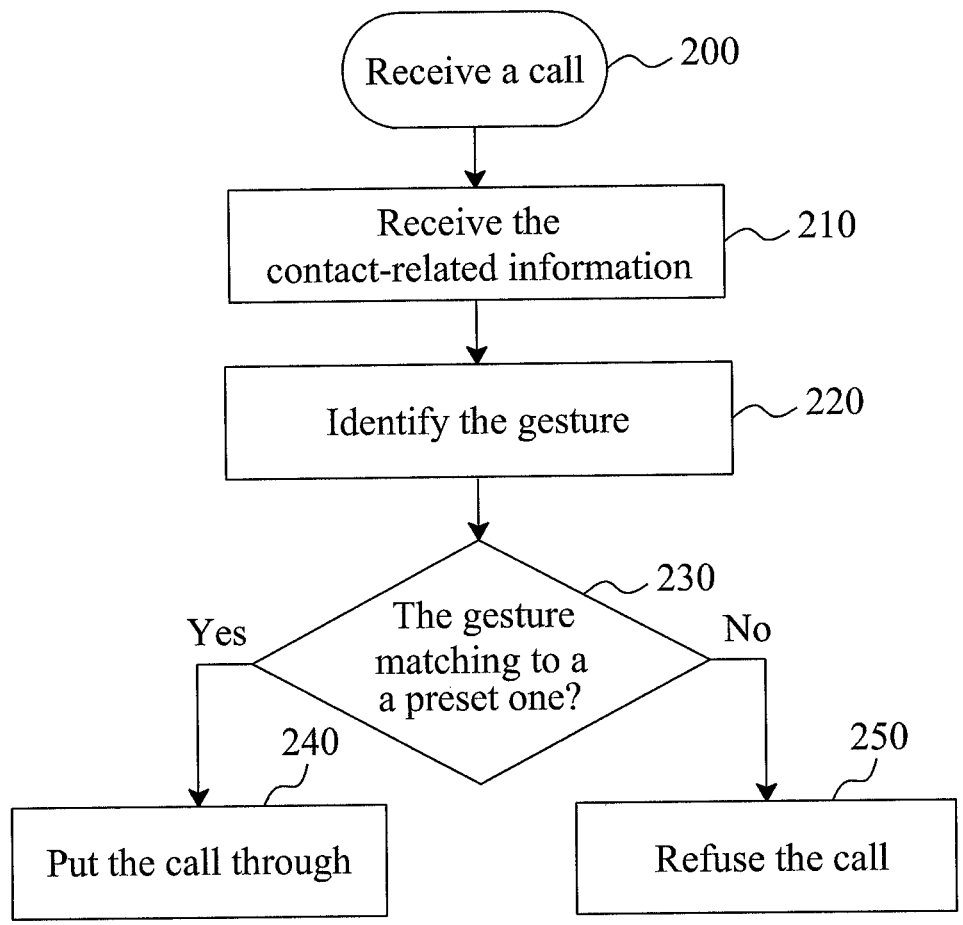
FIG. 2 is a flowchart of a second embodiment according to the present invention.

FIG. 2 shows a second embodiment according to the present invention, in which upon receiving a call in step 200, a touch screen of the cell phone is detected to receive the contact-related information in step 210. Step 220 identifies the gesture according to the contact-related information, and step 230 determines whether or not the gesture matches to a preset one. If yes, the call is put through in step 240; otherwise, the call is refused in step 250.

Figure 3:
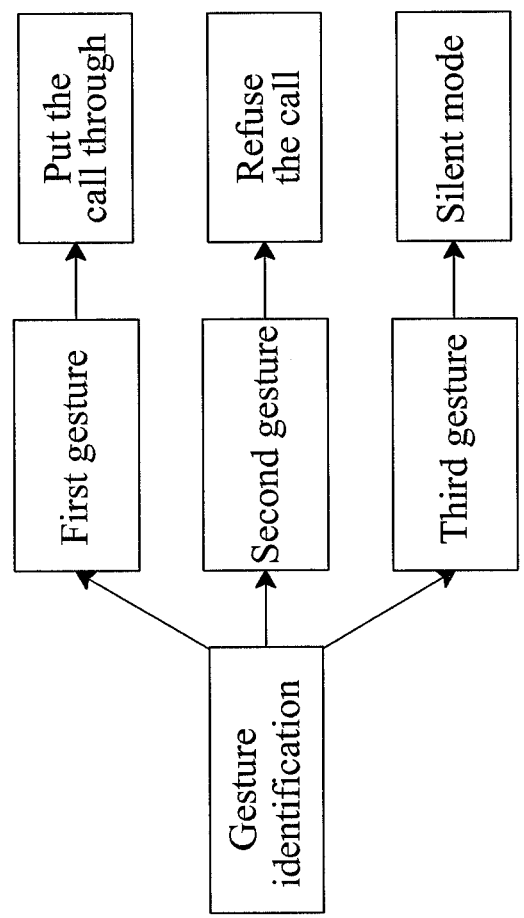
FIG. 3 shows a variant embodiment of FIG. 2.

A variant embodiment of FIG. 2 is shown in FIG. 3, in which function options corresponding to different preset gestures are defined. If the user's gesture matches to a first preset one, the call is put through; if the user's gesture matches to a second preset one, the call is refused; and if the user's gesture matches to a third preset one, the call alert is switched from a ringing mode to a silent mode. The first, second, and third preset gestures are different from one another and include, for example, circling, making a cross, making a check mark, moving along a curve, sliding, moving back and forth, tapping, tapping twice, tapping one and a half time, two fingers moving toward each other, or two fingers moving away from each other.

Figure 4:
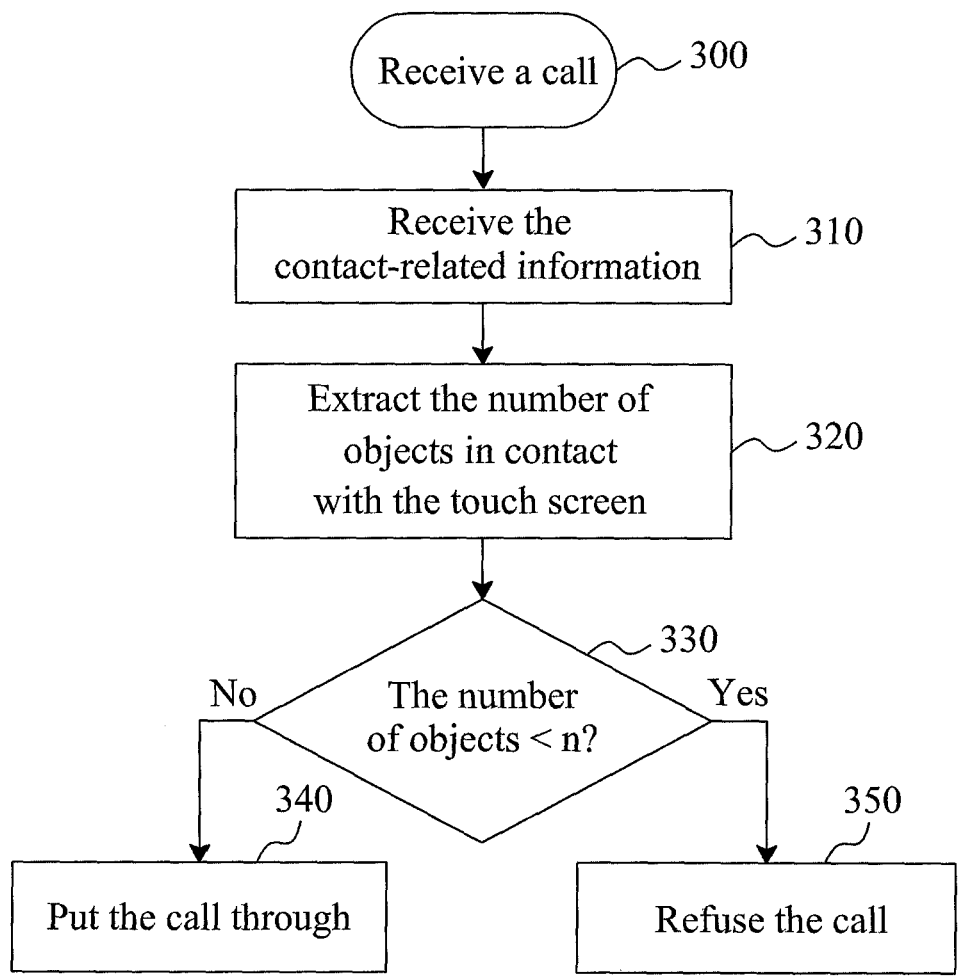
FIG. 4 is a flowchart of a third embodiment according to the present invention.

FIG. 4 illustrates a third embodiment according to the present invention, in which upon receiving a call in step 300, step 310 receives the contact-related information from a touch screen of the cell phone. Then, step 320 extracts the number of objects in contact with the touch screen according to the contact-related information, and step 330 identifies whether or not the number of objects is smaller than a preset value n. If yes, the call is refused in step 350; otherwise, the call is put through in step 340. In another embodiment, the call is refused if the number of objects is greater than the preset value n; the call is put through if the number of objects is smaller than the preset value n; and the call alert is switched from a ringing mode to a silent mode if the number of objects is equal to the preset value n. Typically, the preset value n is a positive integer.

Figure 5:
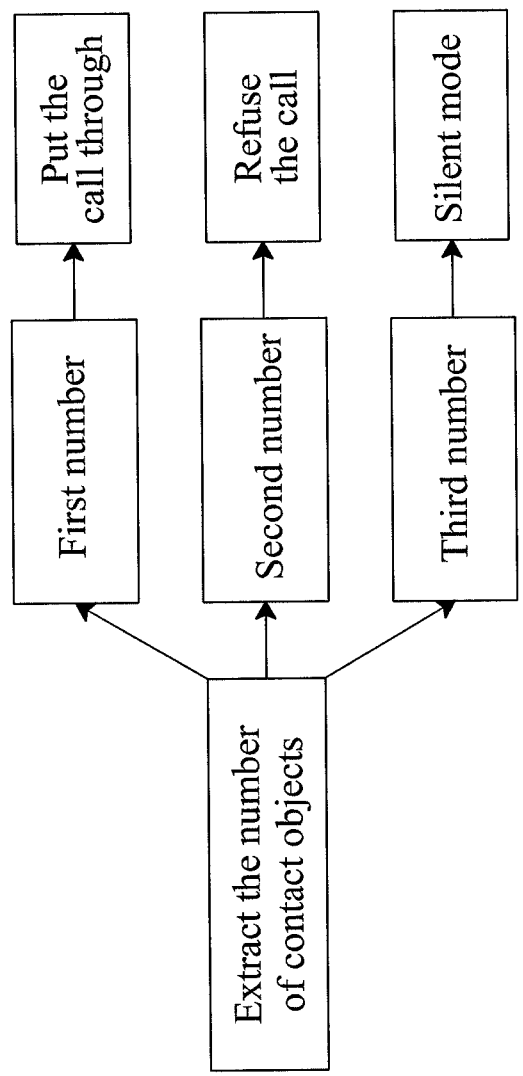
FIG. 5 shows a variant embodiment of FIG. 4.

The embodiment of FIG. 4 may have other variants. In the embodiment of FIG. 4, the number of contact objects is compared with the preset value n. In the embodiment of FIG. 5, however, three numbers of contact objects are preset. When the number of objects is equal to the first number, the call is put through; when the number of objects is equal to the second number, the call is refused; and when the number of objects is equal to the third number, the call alert is switched from a ringing mode to a silent mode. The first, second, and third preset numbers are different from one another and may be programmed.

In the embodiments of FIGS. 4 and 5, the step of identifying multiple objects on the touch screen can be realized by techniques disclosed in U.S. Pat. Nos. 6,323,846 and 5,825,352. In U.S. Pat. No. 6,323,846, the number of objects may be identified by extracting and analyzing a proximity image. In U.S. Pat. No. 5,825,352, the number of objects is identified by analyzing the sensed values along X- and Y-axes of a touchpad.

Figure 6:
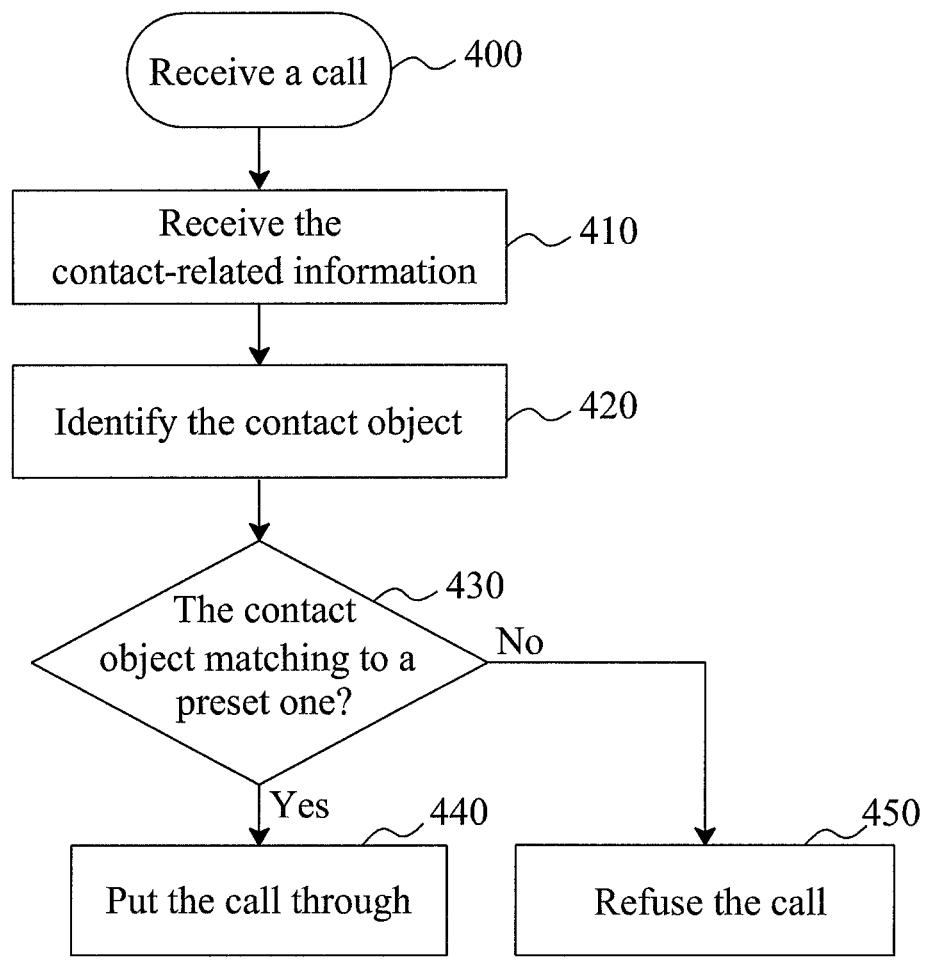
FIG. 6 is a flowchart of a fourth embodiment according to the present invention.

FIG. 6 is a flowchart of a fourth embodiment according to the present invention, in which upon receiving a call in step 400, a touch screen of the cell phone is detected to receive the contact-related information in step 410. Then, in step 420, the object contact on the touch screen is identified according to the contact-related information, and step 430 identifies whether or not the contact object is a preset one. If yes, the call is put through in step 440; otherwise, the call is refused in step 450.

Figure 7:
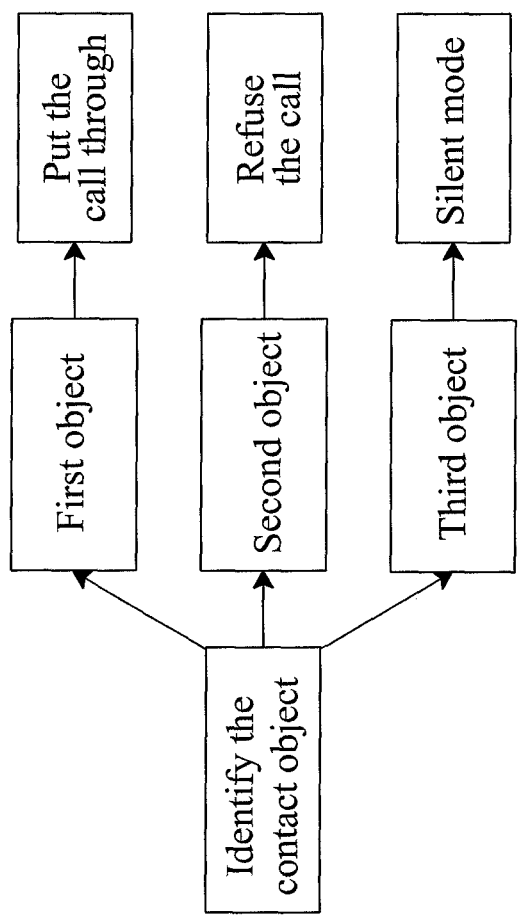
FIG. 7 shows a variant embodiment of FIG. 6.

FIG. 7 is a variant embodiment of FIG. 6, in which there are three preset objects. When it is determined that the contact object is the first preset one, the call is put through; when it is determined that the contact object is the second preset one, the call is refused; and when it is determined that the contact object is the third preset one, the call alert is switched to a silent mode. The first, second, and third preset objects are different from one another and may be programmed.

The preset objects in the embodiments of FIGS. 6 and 7 can be as varied as a thumb, a little finger, a palm, a stylus, and so on. The contact object can be identified, for example, by analyzing the area of contact, which can be realized by a technique disclosed in the above-cited U.S. Pat. No. 6,323,846. It can identify which part of a hand is touching a touchpad by analyzing a proximity image, and even identify the hand as the left hand or the right hand.

Figure 8:
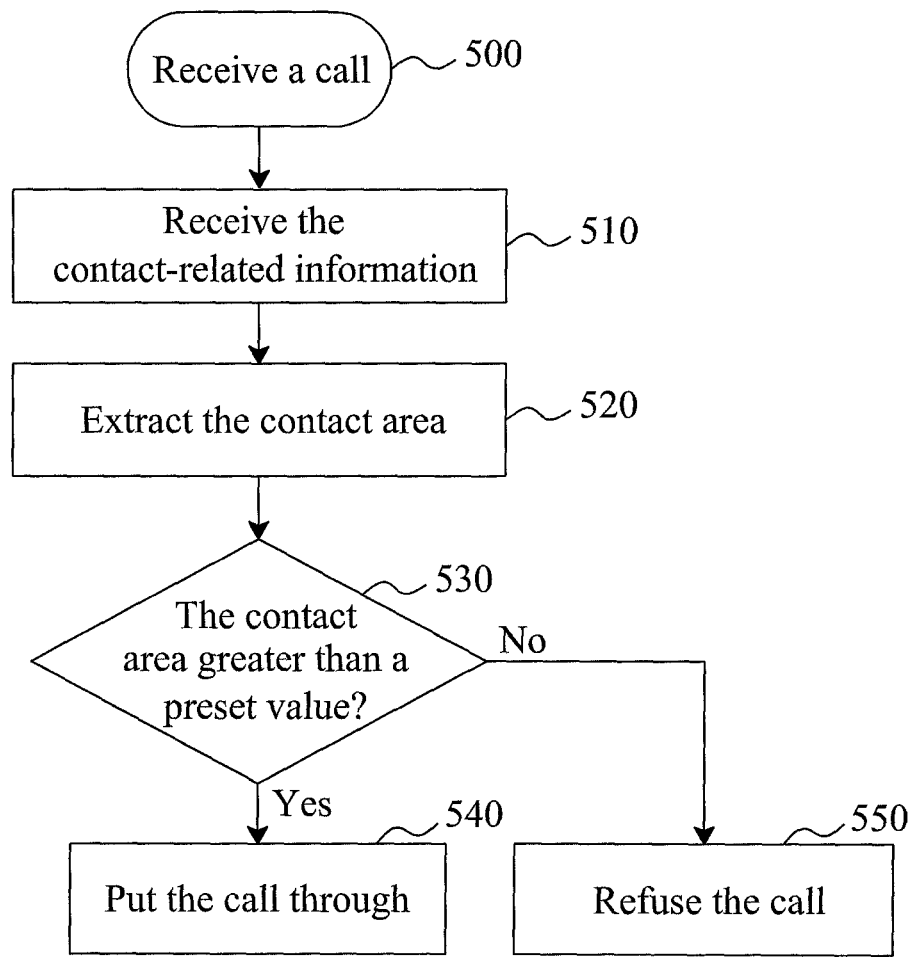
FIG. 8 is a flowchart of a fifth embodiment according to the present invention.

FIG. 8 is a flowchart of a fifth embodiment according to the present invention, in which upon receiving a call in step 500, step 510 receives the contact-related information from a touch screen. Then, step 520 extracts the contact area of the object from the contact-related information, and step 530 identifies whether or not the contact area is greater than a preset value. If yes, the call is put through in step 540; otherwise, the call is refused in step 550. In another embodiment, the call is put through if the contact area is smaller than the preset value, and the call is refused if the contact area is greater than the preset value.

In step 530 of FIG. 8, the contact area of the contact object on the touch panel is compared with the preset value. Step 520 of FIG. 8, which calculates the contact area, can be carried out by a technique disclosed in the above-cited U.S. Pat. No. 6,323,846. It identifies whether or not the contact object is a palm by analyzing the size of the contact area. Whereas in the embodiment of FIG. 8, the size of the contact area directly determines how to deal with the call. In another embodiment, the contact area is evaluated by another way. More specifically, the coordinates of each of multiple contact objects are used to calculate the area enclosed by the multiple contact objects. In other words, it may put the call through or refuse the call by controlling the relative closeness of multiple fingers (say, three fingers) that are in contact with the touch screen.

In the embodiment of FIG. 8, the preset value may be set between the total area of one finger and two fingers. Therefore, when the cell phone receives a call, the user can put the call through by touching the touch screen with two fingers or refuse the call by touching the touch screen with only one finger. In another embodiment, the preset value for the contact area may be set between the area of a fingertip and the area of a region below the thumb. Thus, when the cell phone receives a call, the user can put the call through by touching the touch screen with any one finger or refuse the call by touching the touch screen with the palm. In a further embodiment, a first preset area and a second preset area greater than the first preset area are defined. If the contact area is smaller than the first preset area, the call is put through; if the contact area is between the first preset area and the second preset area, the call alert is switched to a silent mode; and if the contact area is greater than the second preset area, the call is refused.

FIGS. 9 through 13 show some embodiments of the present invention where the techniques of FIGS. 1 through 8 are used to stop the alarm of a cell phone. Other possible modifications can be derived by reference to the following description in conjunction with the description related to FIGS. 1 through 8.

Figure 9:
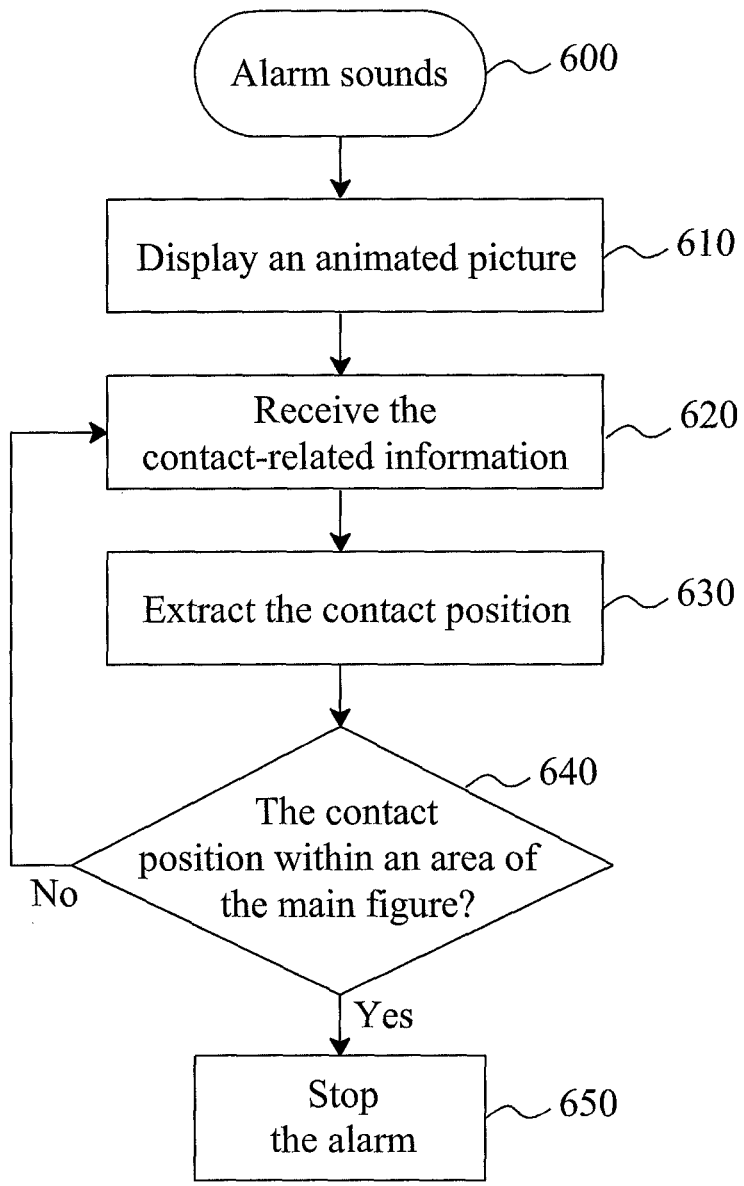
FIG. 9 is a flowchart of a sixth embodiment according to the present invention.

FIG. 9 is a flowchart of a sixth embodiment according to the present invention, for controlling a cell phone when an alarm thereof sounds. When the alarm sounds in step 600, step 610 displays an animated picture which has a main figure by a touch screen. Then, as in the embodiment of FIG. 1, step 620 receives the contact-related information from the touch screen, and step 630 extracts the contact position according to the contact-related information. Step 640 identifies whether or not the contact position falls within an area of the main figure. If yes, the alarm is stopped in step 650; otherwise, the process goes back to step 620.

Figure 10:
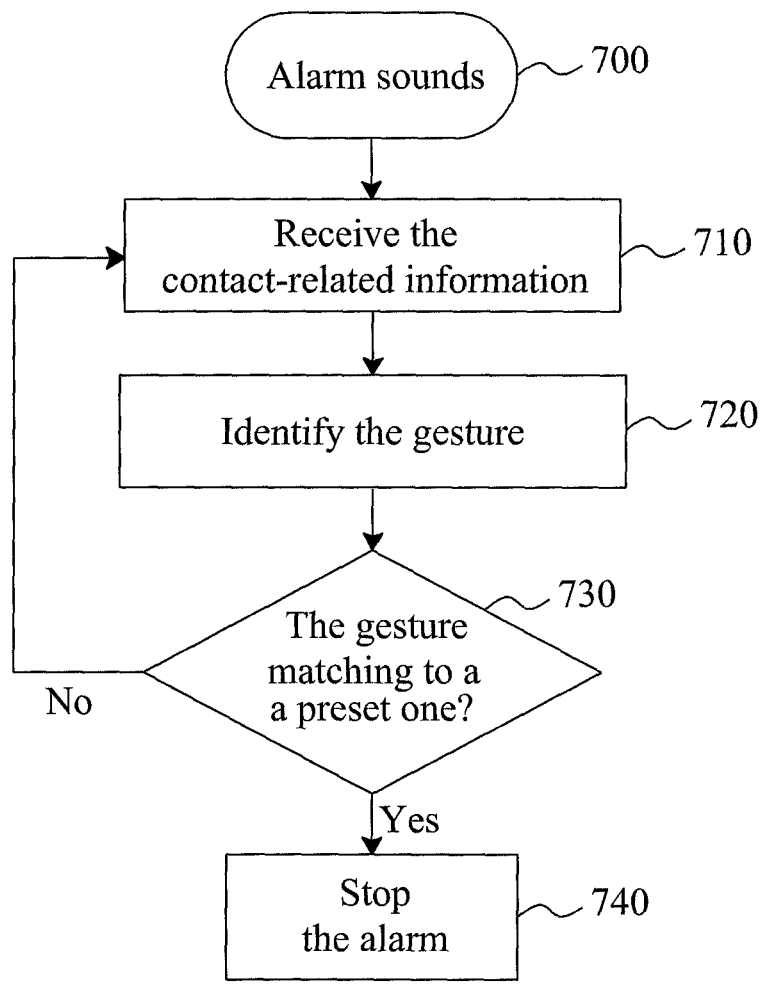
FIG. 10 is a flowchart of a seventh embodiment according to the present invention.

FIG. 10 is a flowchart of a seventh embodiment according to the present invention. When an alarm of the cell phone sounds in step 700, step 710 receives the contact-related information from a touch screen of the cell phone, and step 720 identifies the gesture according to the contact-related information. If the gesture is conformed to match to a preset one in step 730, the alarm is stopped in step 740; otherwise, the process goes back to step 710.

Figure 11:
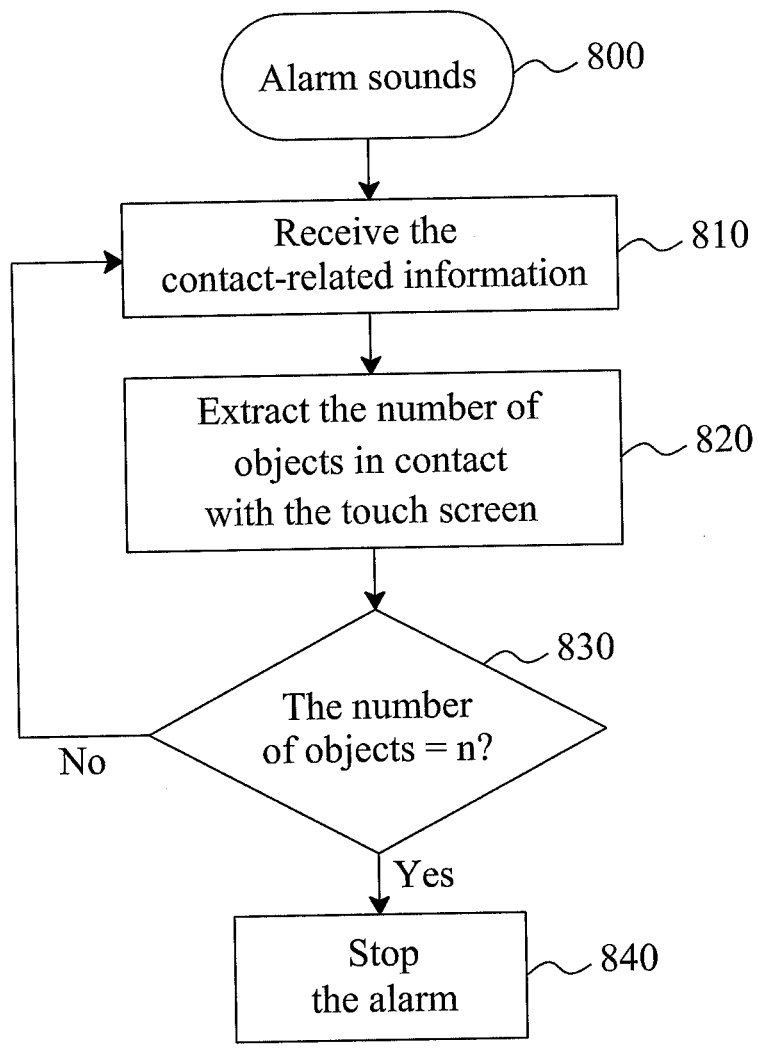
FIG. 11 is a flowchart of an eighth embodiment according to the present invention.

FIG. 11 is a flowchart of an eighth embodiment according to the present invention. When an alarm of the cell phone sounds in step 800, step 810 receives the contact-related information from a touch screen of the cell phone, and from the contact-related information, step 820 extracts the number of contact objects such as fingers on the touch screen. If it is determined in step 830 that the number of objects is equal to a preset value n, the alarm is stopped in step 840; otherwise, the process goes back to step 810. In an embodiment, the preset value n is one.

Figure 12:
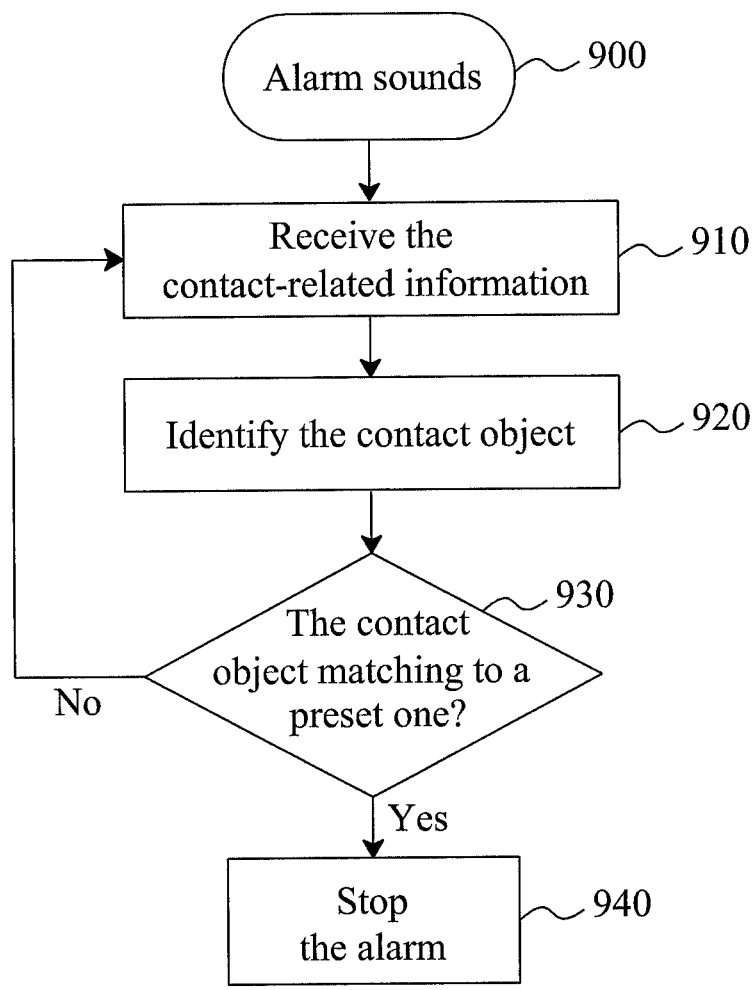
FIG. 12 is a flowchart of a ninth embodiment according to the present invention.

FIG. 12 is a flowchart of a ninth embodiment according to the present invention. When an alarm of the cell phone sounds in step 900, step 910 receives the contact-related information from a touch screen of the cell phone, and step 920 identifies the contact object. If it is determined in step 930 that the contact object matches a preset one, the alarm is stopped in step 940; otherwise, the process goes back to step 910.

Figure 13:
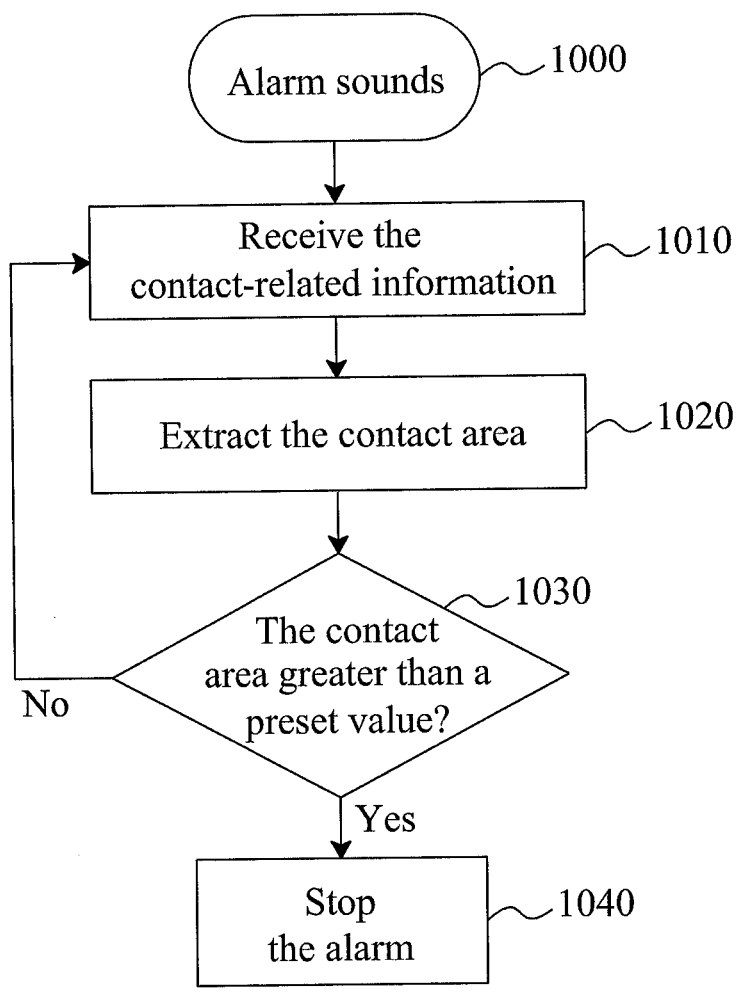
FIG. 13 is a flowchart of a tenth embodiment according to the present invention.

FIG. 13 is a flowchart of a tenth embodiment according to the present invention. When an alarm of the cell phone sounds in step 1000, step 1010 receives the contact-related information from a touch screen of the cell phone, and step 1020 extracts the contact area from the contact-related information. Then, step 1030 identifies whether or not the contact area is greater than a preset value. If yes, the alarm is stopped in step 1040; otherwise, the process goes back to step 1010.

Figure 14:
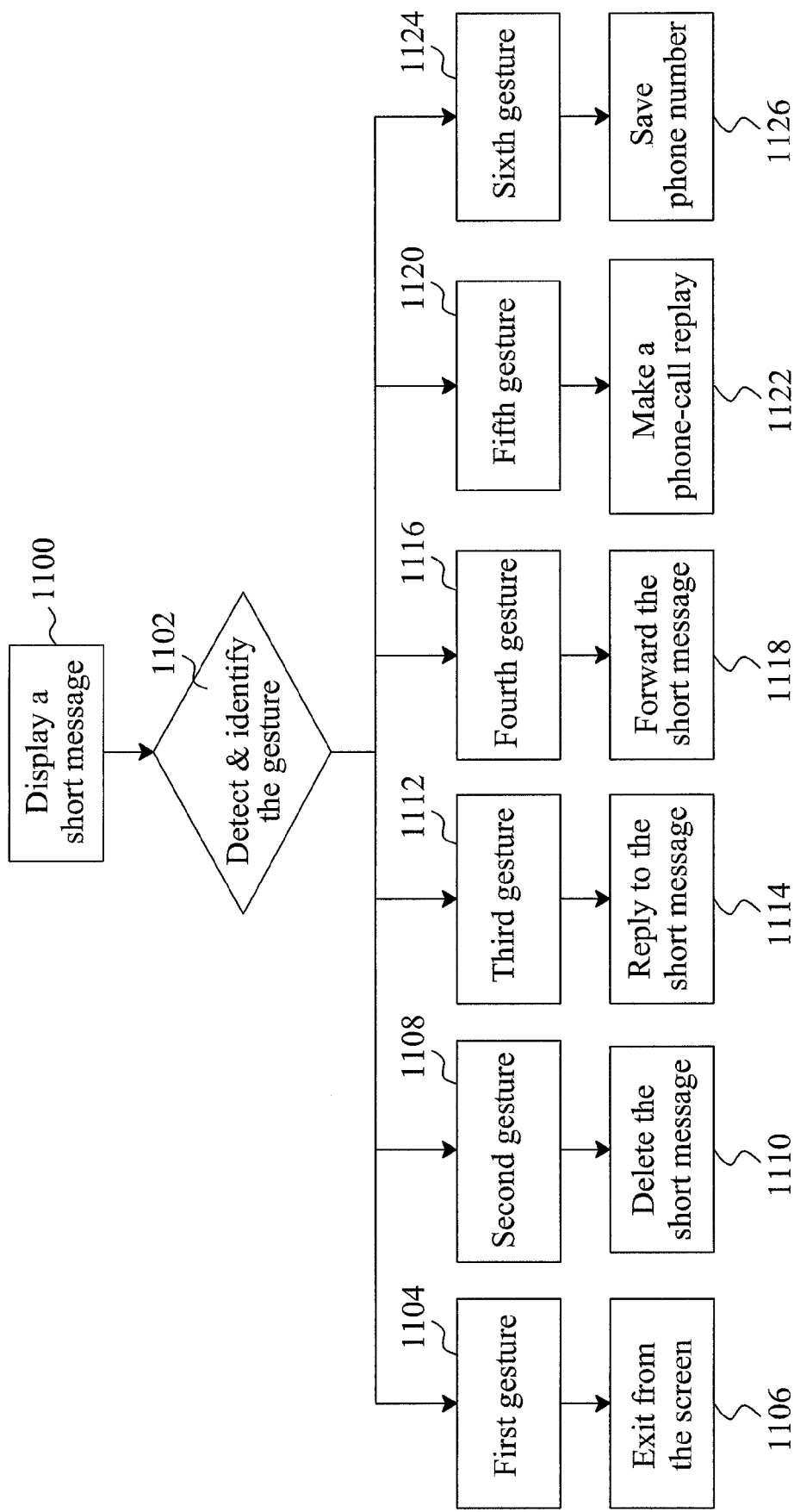
FIG. 14 is a flowchart of an eleventh embodiment according to the present invention.

FIG. 14 is a flowchart of an eleventh embodiment according to the present invention, in which when the user switches the current screen of the cell phone to a short message screen to display a short message in step 1100, step 1102 begins to detect and identify the gesture on a touch screen of the cell phone. If the gesture matches to a first one 1104, the currently displayed short message screen is exited in step 1106. If the gesture matches to a second one 1108, the short message in display is deleted in step 1110. If the gesture matches to a third one 1112, the short message screen is switched to a short message edit screen to reply to the short message in step 1114. If the gesture matches to a fourth one 1116, the short message in display is forwarded in step 1118, in which the short message screen is preferably switched to a phone book for the user to choose a phone number to which the short message is to be forwarded. If the gesture matches to a fifth one 1120, the phone number from which the short message is sent is dialed to make a phone-call reply in step 1122. If the gesture matches to a sixth one 1124, the phone number from which the short message is sent is saved in step 1126. Preferably, the first through sixth gestures can be defined by the user.

Figure 15:
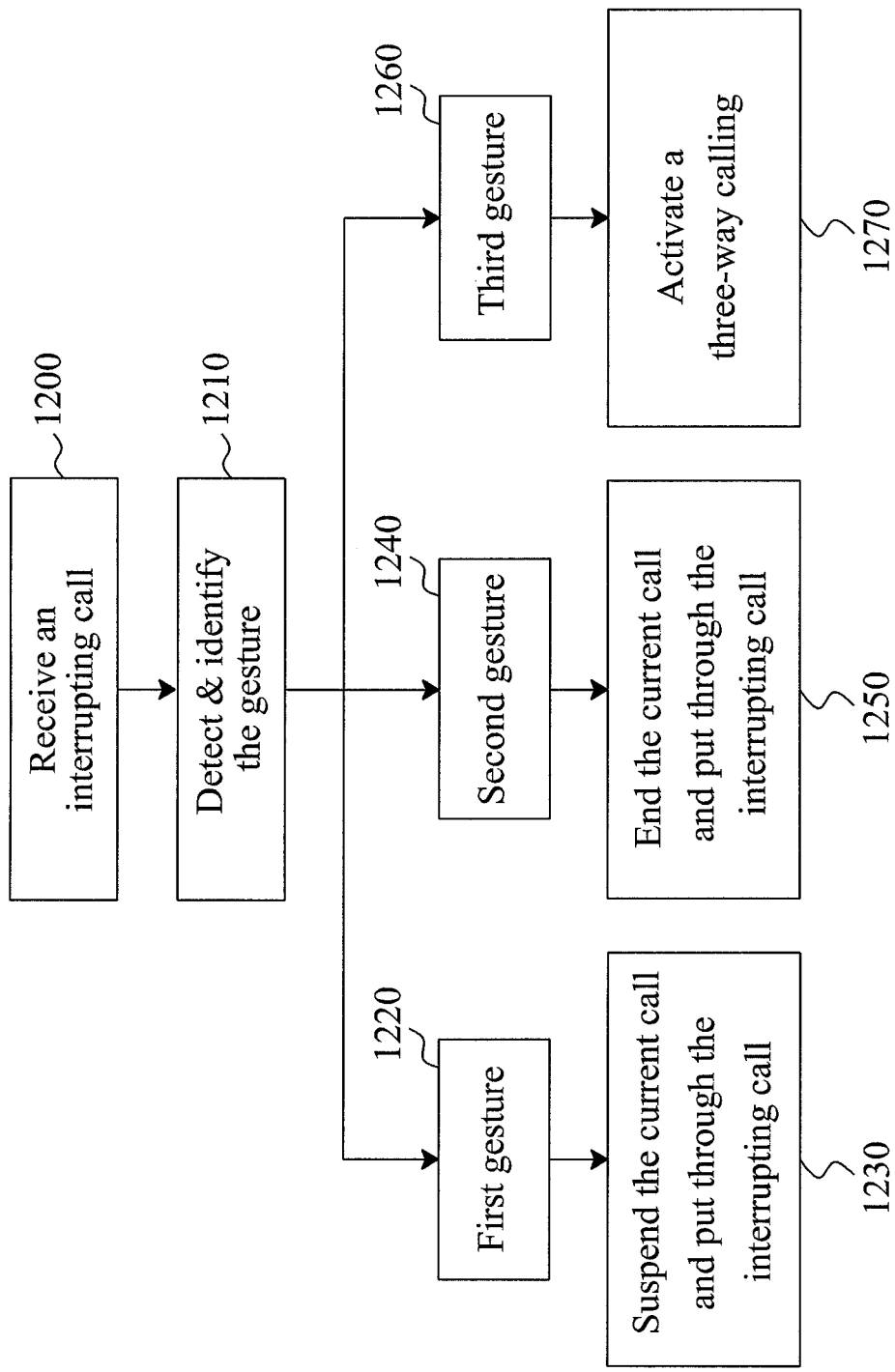
FIG. 15 is a flowchart of a twelfth embodiment according to the present invention.

FIG. 15 illustrates a twelfth embodiment according to the present invention. Upon receiving an interrupting call in step 1200, step 1210 begins to detect and identify the gesture on a touch screen of the cell phone. If the gesture matches to a first one 1220, step 1230 suspends the call currently in progress and puts through the interrupting call. If the gesture matches to a second one 1240, step 1250 ends the call currently in progress and puts through the interrupting call. If the gesture matches to a third one 1260, step 1270 activates a three-way calling. With the conventional cell phone systems, the operations described above involve complicated procedures. Besides, in order to carry out the steps for handling an interrupting call, a user of the conventional cell phone systems must temporarily stop talking on the phone. On the other hand, the control method of the present invention is simple and therefore minimizes interference with conversation on the phone.

Figure 16:
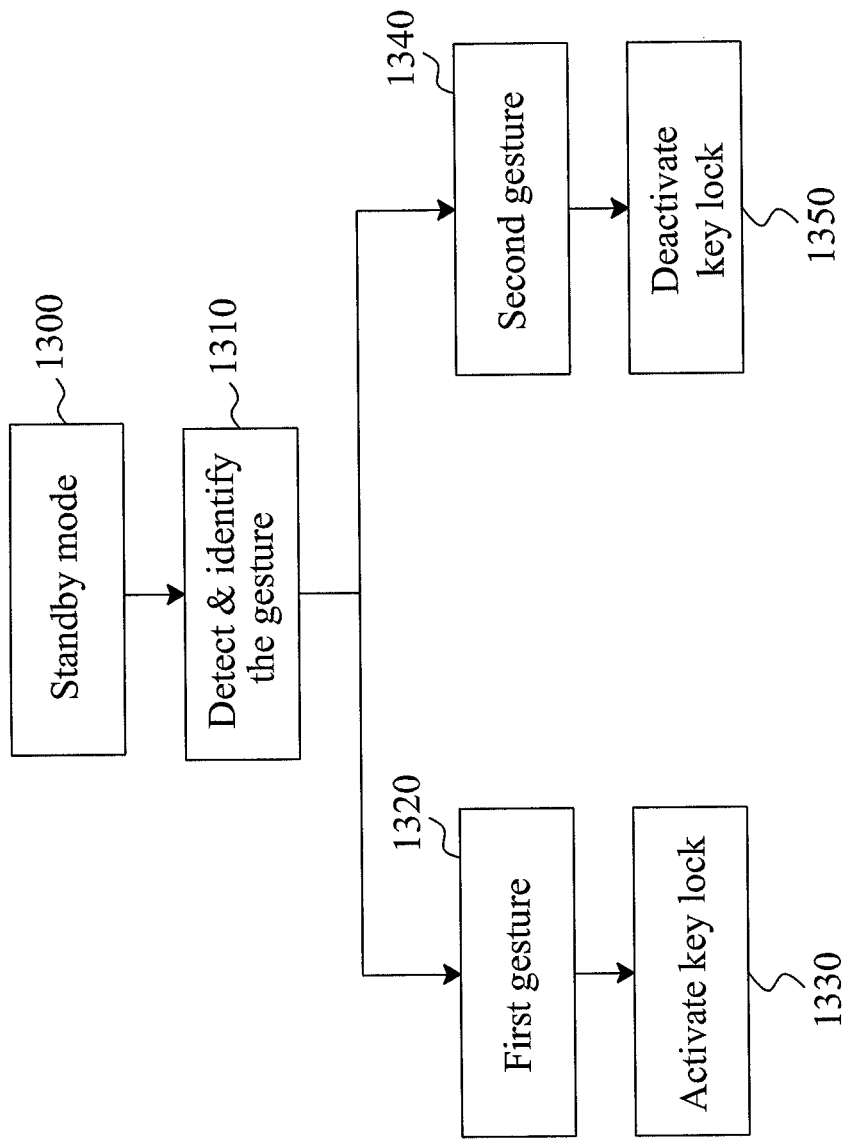
FIG. 16 is a flowchart of a thirteenth embodiment according to the present invention.

FIG. 16 shows a thirteenth embodiment according to the present invention. While the cell phone is in a standby mode in step 1300, step 1310 detects and identifies the gesture on a touch screen of the cell phone. If the user inputs a first gesture 1320, then step 1330 activates a key lock. If a key locked is already activated, and a second gesture 1340 is inputted, then step 1350 deactivates the key lock. In different embodiments, the first gesture may be the same as or different from the second gesture. If a same gesture is defined as both the first and second gestures, the user will be conveniently to activate and deactivate a key lock with a single gesture.

In short, the principle of the present invention is to take full advantage of the contact-related information from a touch control interface or an alarm of a cell phone to perform various functions. The contact-related information can be used to identify the gesture, the number of contact objects such as fingers, the type of contact object, the contact area, the contact position, and so forth, thereby determining the functions to be executed.

While the present invention has been described in conjunction with preferred embodiment thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A control method for a cell phone receiving a call, the cell phone having a touch screen, the control method comprising:
   upon detecting said call from a caller:
      displaying an animated picture on the touch screen, the animated picture including a main figure, said main figure having a plurality of figure areas;
      touching one of said plurality of figure areas;
      receiving a contact-related information from the touch screen as to a particular area touched to define a contact position;
      extracting said contact position from the contact-related information; and
      putting the call through only if the contact position falls within a predetermined area of the main figure.

2. The control method of claim 1, wherein the main figure is at a time-varying position on the touch screen.

3. The control method of claim 1, wherein the main figure comprises an animal.

4. A control method for a cell phone receiving a call, the cell phone having a touch screen, the control method comprising:
   upon detecting said call from a caller:
      receiving a contact-related information from the touch screen having a surface area;
      identifying a gesture from the contact-related information applied throughout the surface area; and
      putting the call through if the gesture matches to a preset one, regardless of a contact position on the surface area.

5. The control method of claim 4, further comprising refusing the call if the gesture matches to a second preset one.

6. The control method of claim 4, further comprising switching a call alert of the call to a silent mode if the gesture matches to a second preset one.

7. The control method of claim 4, wherein the preset gesture is selected from the group consisting of circling, making a cross, making a check mark, moving along a curve, sliding, moving back and forth, tapping, tapping twice, tapping one and half times, moving two fingers toward each other, and moving two fingers away from each other.

8. A control method for a cell phone receiving a call, the cell phone having a touch screen, the control method comprising:
   upon detecting said call from a caller:
      receiving a contact-related information from the touch screen having a surface area;
      identifying a number of objects in contact with the touch screen throughout the surface area according to the contact-related information; and
      putting the call through if the number is equal to a preset value, regardless of a contact position on the surface area.

9. The control method of claim 8, further comprising refusing the call if the number is equal to a second preset value.

10. The control method of claim 8, further comprising switching a call alert of the call to a silent mode if the number is equal to a second preset value.

11. A control method for a cell phone receiving a call, the cell phone having a touch screen, the control method comprising:
   upon detecting said call from a caller:
      receiving a contact-related information from the touch screen having a surface area;
      identifying a number of objects in contact with the touch screen throughout the surface area according to the contact-related information; and
      comparing the number with a preset value for determining whether or not to put the call through, regardless of a contact position on the surface area.

12. The control method of claim 11, wherein the step of comparing the number with a preset value for determining whether or not to put the call through comprises refusing the call if the number is smaller than the preset value.

13. The control method of claim 11, wherein the step of comparing the number with a preset value for determining whether or not to put the call through comprises putting the call through if the number is greater than the preset value.

14. The control method of claim 11, wherein the step of comparing the number with a preset value for determining whether or not to put the call through comprises switching a call alert of the call to a silent mode if the number is equal to the preset value.

15. A control method for a cell phone receiving a call, the cell phone having a touch screen, the control method comprising:
   upon detecting said call from a caller:
      receiving a contact-related information from the touch screen throughout a surface area defined by said touch screen;
      identifying a contact object contacted on the surface area from the contact-related information; and
      putting the call through if the contact object contacted on the surface area matches to a preset one, regardless of a contact position on the surface area.

16. The control method of claim 15, further comprising refusing the call if the contact object matches to a second preset one.

17. The control method of claim 15, further comprising switching a call alert of the call to a silent mode if the contact object matches to a second preset one.

18. A control method for a cell phone receiving a call, the cell phone having a touch screen, the control method comprising:
   upon detecting said call from a caller:
      receiving a contact-related information from the touch screen;
      extracting an area of the contact object on the touch screen from the contact-related information; and
      comparing the area with a preset value for determining whether or not to put the call through, regardless of a contact position on the touch screen.

19. The control method of claim 18, wherein the step of comparing the area with a preset value for determining whether or not to put the call through comprises refusing the call if the area is smaller than the preset value.

20. The control method of claim 18, wherein the step of comparing the area with a preset value for determining whether or not to put the call through comprises putting the call through if the area is greater than the preset value.

21. The control method of claim 18, further comprising:
   presetting a second value greater than the first preset value;
   putting the call through if the area is smaller than the first preset value;
   switching a call alert of the call to a silent mode if the area is greater than the first preset value but smaller than the second preset value; and
   refusing the call if the area is greater than the second preset value.

22. A control method for a cell phone when an alarm of the cell phone sounds, the cell phone having a touch screen, the control method comprising:
   upon sounding of said alarm:
      displaying an animated picture on the touch screen, the animated picture including a main figure, said main figure having a plurality of figure areas;
      touching one of said plurality of figure areas;
      receiving a contact-related information from the touch screen as to a particular area touched to define a contact position;
      extracting said contact position from the contact-related information; and
      stopping the alarm only if the contact position falls within a predetermined area of the main figure.

23. The control method of claim 22, wherein the main figure is at a time-varying position on the touch screen.

24. A control method for a cell phone when an alarm of the cell phone sounds, the cell phone having a touch screen, the control method comprising:
   upon sounding of said alarm:
      receiving a contact-related information from the touch screen having a surface area;
      identifying a gesture from the contact-related information applied throughout the surface area; and
      stopping the alarm if the gesture matches to a preset one, regardless of a contact position on the surface area.

25. The control method of claim 24, wherein the preset gesture is selected from the group consisting of circling, making a cross, making a check mark, moving along a curve, sliding, moving back and forth, tapping, tapping twice, tapping one and half times, moving two fingers toward each other, and moving two fingers away from each other.

26. A control method for a cell phone when an alarm of the cell phone sounds, the cell phone having a touch screen, the control method comprising:
   upon sounding of said alarm:
      receiving a contact-related information from the touch screen having a surface area;
      identifying a number of objects in contact with the touch screen applied throughout the surface area according to the contact-related information; and
      stopping the alarm if the number is equal to a preset value, regardless of a contact position on the surface area.

27. The control method of claim 26, wherein the preset value is one.

28. A control method for a cell phone when an alarm of the cell phone sounds, the cell phone having a touch screen, the control method comprising:
   upon sounding of said alarm:
      receiving a contact-related information from the touch screen;
      identifying a number of objects in contact with the touch screen according to the contact-related information; and
      comparing the number with a preset value for determining whether or not to stop the alarm, regardless of a contact position on the touch screen.

29. A control method for a cell phone when an alarm of the cell phone sounds, the cell phone having a touch screen, the control method comprising:
   upon sounding of said alarm:
      receiving a contact-related information from the touch screen;
      identifying a contact object contacted on the touch screen from the contact-related information; and
      stopping the alarm if the contact object contacted on the touch screen matches to a preset one, regardless of a contact position on the touch screen.

30. The control method of claim 29, wherein the preset object is a thumb.

31. A control method for a cell phone when an alarm of the cell phone sounds, the cell phone having a touch screen, the control method comprising:
   upon sounding of said alarm:
      receiving a contact-related information from the touch screen;
      extracting an area of the contact object on the touch screen from the contact-related information; and
      stopping the alarm if the area is greater than a preset value, regardless of a contact position on the touch screen.

32. A control method for a cell phone displaying a short message, the cell phone having a touch screen, the control method comprising:
   upon displaying said short message:
      receiving a contact-related information from the touch screen having a surface area;
      detecting and identifying a gesture applied throughout the surface area according to the contact- related information; and
      performing a further step on the short message according to the gesture, regardless of a contact position on the surface area.

33. The control method of claim 32, wherein the gesture is selected from the group consisting of circling, making a cross, making a check mark, moving along a curve, sliding, moving back and forth, tapping, tapping twice, tapping one and a half time, moving two fingers toward each other, and moving two fingers away from each other.

34. The control method of claim 32, wherein the further step comprises exiting from a screen displaying the short message, deleting the short message, replying to the short message, forwarding the short message, dialing a phone number from which the short message is sent, or saving the phone number.

35. A control method for a cell phone receiving an interrupting call when a call is already put through, the cell phone having a touch screen, the control method comprising:
   upon detecting said interrupting call:
      receiving a contact-related information from the touch screen;
      detecting and identifying a gesture according to the contact- related information; and
      performing a further step on the already put through call and the interrupting call according to the gesture, regardless of a contact position on the touch screen.

36. The control method of claim 35, wherein the gesture is selected from the group consisting of circling, making a cross, making a check mark, moving along a curve, sliding, moving back and forth, tapping, tapping twice, tapping one and half times, moving two fingers toward each other, and moving two fingers away from each other.

37. The control method of claim 35, wherein the further step comprises suspending the already put through call and putting the interrupting call through, ending the already put through call and putting the interrupting call through, or activating a three-way calling.

38. A control method for a cell phone in a standby mode, the cell phone having a touch screen, the control method comprising:
   while in said standby mode:
      receiving a contact-related information from the touch screen;
      detecting and identifying a gesture according to the contact-related information; and
      performing a further step according to the gesture, regardless of a contact position on the touch screen.

39. The control method of claim 38, wherein the gesture is selected from the group consisting of circling, making a cross, making a check mark, moving along a curve, sliding, moving back and forth, tapping, tapping twice, tapping one and half times, moving two fingers toward each other, and moving two fingers away from each other.

40. The control method of claim 38, wherein the further step comprises activating or deactivating a key lock.

* * * * *